A. Sweet,
Scaffold.

No. 111,094. Patented Jan. 19, 1871.

2 Sheets, Sheet 1.

Witnesses:
Chas Kenyon
A. D. Kane

Inventor
Asel Sweet
Chipman Hosmer & Co
Attys

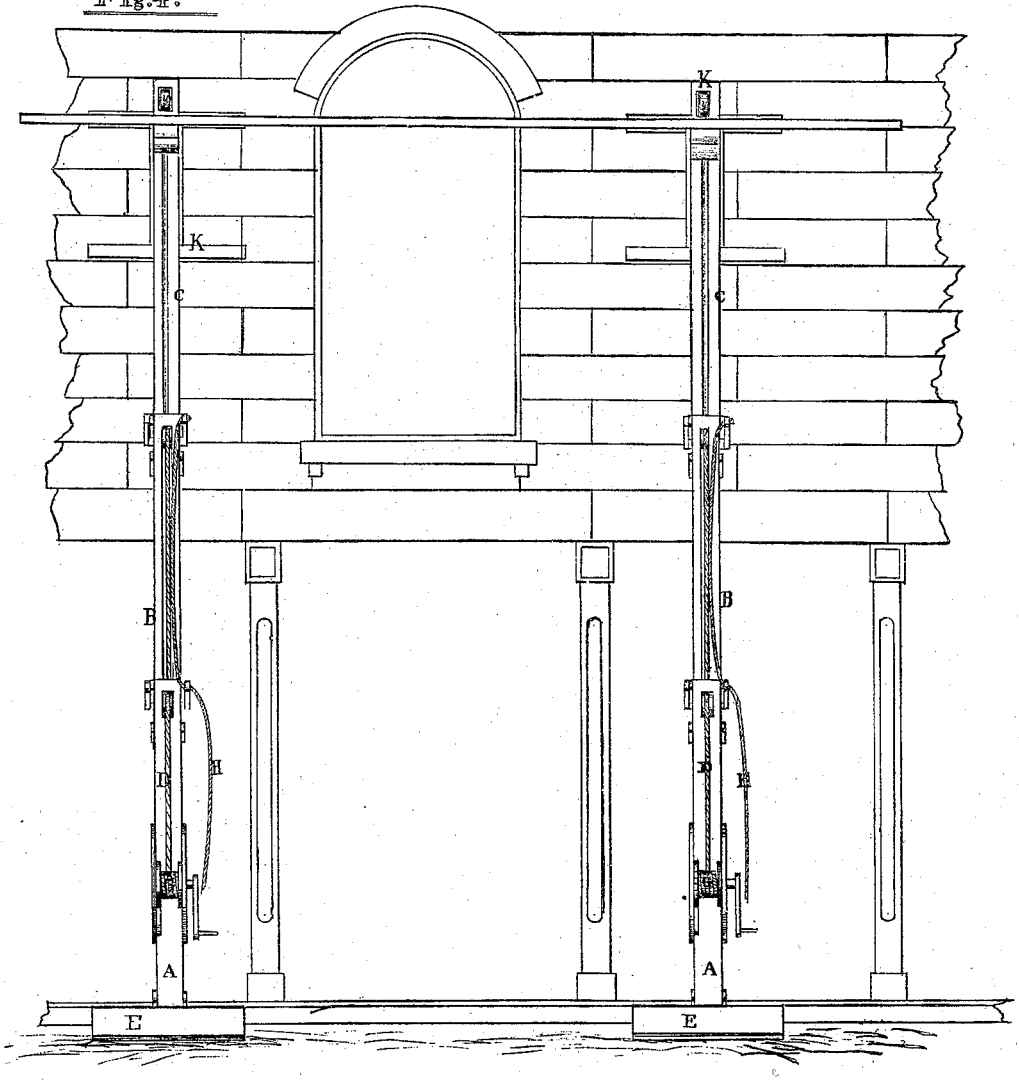

United States Patent Office.

ASEL SWEET, OF WESTFIELD, PENNSYLVANIA, ASSIGNOR OF ONE-HALF HIS RIGHT TO GEORGE W. CHRISHOLM, OF SAME PLACE.

Letters Patent No. 111,094, dated January 17, 1871.

IMPROVEMENT IN EXTENSION-SCAFFOLDS.

The Schedule referred to in these Letters Patent and making part of the same.

*To all whom it may concern:*

Be it known that I, ASEL SWEET, of Westfield, in the county of Tioga and State of Pennsylvania, have invented a new and valuable Improvement in Extension-Scaffolding Supports; and I do hereby declare that-the following is a full, clear, and exact description of the construction and operation of the same, reference being had to the annexed drawing, making a part of this specification, and to the letters and figures of reference marked thereon.

Figure 1 of the drawing is a side view of my invention folded up.

Figure 4 is a front view.

Figure 1:
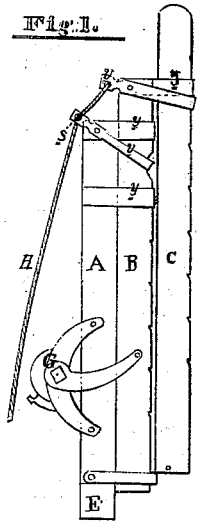

My invention relates to scaffolds for builders' use, and consists in a novel arrangement of devices intended to serve as a useful apparatus for the purpose named.

The parts marked respectively A, B, and C, upon the drawing, represent extension-bars, of which the parts B and C have notches formed in their under sides, as shown, and all of them have grooves cut in their upper sides extending from end to end, to provide for the security of the lifting-rope D, hereinafter mentioned.

E represents a horizontal base-block for the bar A, and into which said bar is framed, as represented.

The letter *a* represents a pulley, arranged in the head of bar A; and

*c*, *n*, and *r* are similar pulleys, arranged in bar B, as shown.

G represents a windlass and crank, arranged upon the bar A for the purpose of operating the lifting-rope D.

The letters *v v* represent staples or clamps, pivoted, respectively, to the bars A and B, as shown, and which operate in conjunction with the notches on said bars to hold said bars in the positions desired.

I make an eye, *s*, in the end of said clamps, respectively, as shown, in which the trip-rope is affixed, as hereinafter described, and in the manner shown on fig. 3.

H represents the trip-rope, arranged as shown on the drawing, by means of which the clamps *v* are freed from their notches and the several bars allowed to slide downward until they assume the position shown on fig. 1.

The letters T represent bands inclosing the bars A, B, and C, in the manner shown.

Figure 3:
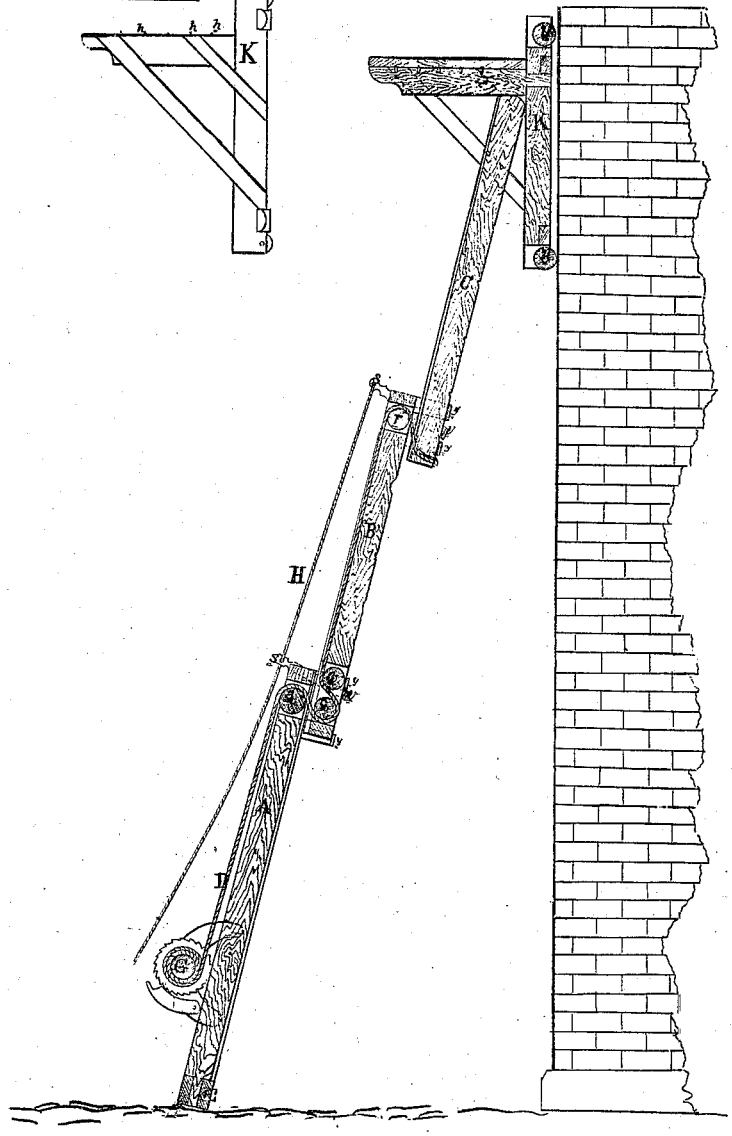
Figure 3 is a central vertical section.

The lifting-rope D is arranged in my apparatus in the manner shown on fig. 3, and being operated by means of the crank and windlass G, the bars B and C are raised upward at will.

Figure 2:
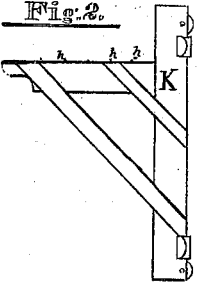
Figure 2 is a side view of bracket.

K represents the bracket, constructed in the form shown on fig. 2, and when in use arranged upon the top of bar C in the manner shown on fig. 3.

It has friction-rollers *u* affixed to its vertical bar, as shown, and brads *h* affixed to its horizontal bar. The rollers *u* serve to facilitate its movement up and down on the side of a building, while the brads *h* serve to keep the platform of boards placed thereon from slipping endwise.

I claim as my invention—

The apparatus herein described for sustaining and adjusting a builders' scaffold, when constructed with extension-bars A, B, and C, with their pulleys, bracket *k*, clamps *v v*, trip-rope H, windlass G, and lifting-rope D, all constructed, arranged, and operated as set forth.

In testimony that I claim the above I have hereunto subscribed my name in the presence of two witnesses.

ASEL SWEET.

Witnesses:
  MILTON J. WARNER,
  J. NEWTON DEXTER.